United States Patent
Hoeffken et al.

(10) Patent No.: US 10,968,801 B2
(45) Date of Patent: Apr. 6, 2021

(54) CONNECTING PIECE FOR FLUID LINES OF AN EXHAUST-GAS AFTERTREATMENT SYSTEM

(71) Applicant: Robert Bosch GmbH, Stuttgart (DE)

(72) Inventors: Tobias Hoeffken, Stuttgart (DE); Marc Chaineux, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/646,235

(22) PCT Filed: Jul. 16, 2018

(86) PCT No.: PCT/EP2018/069241
§ 371 (c)(1),
(2) Date: Mar. 11, 2020

(87) PCT Pub. No.: WO2019/048117
PCT Pub. Date: Mar. 14, 2019

(65) Prior Publication Data
US 2020/0271033 A1    Aug. 27, 2020

(30) Foreign Application Priority Data

Sep. 11, 2017  (DE) ............... 10 2017 215 950.2

(51) Int. Cl.
*F01N 3/20* (2006.01)
*B01D 71/56* (2006.01)
(Continued)

(52) U.S. Cl.
CPC ........... *F01N 3/2066* (2013.01); *B01D 71/56* (2013.01); *F16L 41/021* (2013.01); *G01F 11/28* (2013.01);
(Continued)

(58) Field of Classification Search
CPC combination set(s) only.
See application file for complete search history.

(56) References Cited

U.S. PATENT DOCUMENTS

| 4,906,256 A * | 3/1990 | Baker .................. B01D 53/22 95/48 |
| 8,459,237 B2 * | 6/2013 | Erdmann ......... B60K 15/03519 123/516 |

(Continued)

FOREIGN PATENT DOCUMENTS

| EP | 2685060 | 1/2014 |
| WO | 2015153350 | 10/2015 |

OTHER PUBLICATIONS

International Search Report for Application No. PCT/EP2018/069241 dated Sep. 10, 2018 (English Translation, 2 pages).

*Primary Examiner* — Binh Q Tran
(74) *Attorney, Agent, or Firm* — Michael Best & Friedrich LLP

(57) ABSTRACT

The invention relates to a connecting piece (6) for fluid lines of an exhaust gas aftertreatment system (1), comprising a hollow body (6a) having at least three fluid connection points (14, 15), which are fluidically connected to each other in the hollow body (6a), at least two of the fluid connection points (15) being separated from a third fluid connection point (14) by means of respective membranes (19), each membrane (19) being permeable to a liquid and, when wetted by the liquid, being impermeable to a gas.

17 Claims, 3 Drawing Sheets

(51) Int. Cl.
*F16L 41/02* (2006.01)
*G01F 11/28* (2006.01)
*G01F 15/08* (2006.01)

(52) U.S. Cl.
CPC .......... *G01F 15/08* (2013.01); *F01N 2530/04* (2013.01); *F01N 2530/18* (2013.01); *F01N 2610/14* (2013.01); *F01N 2610/1453* (2013.01)

(56) References Cited

U.S. PATENT DOCUMENTS

| | | | |
|---|---|---|---|
| 9,546,583 B2 * | 1/2017 | Leone | F02M 37/0088 |
| 10,190,458 B2 * | 1/2019 | Koukan | B60K 13/04 |
| 2009/0277328 A1 * | 11/2009 | Wijmans | B01D 53/22 |
| | | | 95/51 |
| 2015/0053704 A1 * | 2/2015 | Hill | B60K 15/03519 |
| | | | 220/746 |

\* cited by examiner

CONNECTING PIECE FOR FLUID LINES OF AN EXHAUST-GAS AFTERTREATMENT SYSTEM

BACKGROUND OF THE INVENTION

The invention relates to a connecting piece for fluid lines of an exhaust-gas aftertreatment system, which has a hollow body having at least three fluid ports, which ports are connected to one another in a fluid-conducting manner in the hollow body.

The invention also relates to a dosing system for dosing in a liquid, in particular for an exhaust-gas aftertreatment system of an internal combustion engine, which has at least one conveying device, a main line, at least two fluid lines and at least two dosing valves.

Exhaust-gas aftertreatment dosing systems are already known from the prior art. Such systems normally have a conveying module and a dosing valve for dosing a liquid exhaust-gas aftertreatment agent (liquid) into the exhaust gas of an internal combustion engine, wherein, at present, systems having more than two dosing valves are being developed. Typically, the connection between the at least one conveying module and the at least two dosing valves is realized such that a main line coming from the conveying module is divided by way of a connecting piece into two lines for the two dosing valves.

When an exhaust-gas aftertreatment system is switched off, it is usually the case that all the lines present—and at least partially filled with liquid at this point in time—are emptied or aerated by way of "sucking back" or application of a negative pressure, in particular to prevent freezing of liquid in the lines and in the dosing valve at temperatures below the freezing point.

With the emptying of an exhaust-gas aftertreatment system having two or more dosing valves, there is however then the challenge of bringing about an emptied state of all the lines of the exhaust-gas aftertreatment system, such that not only is resistance to freezing provided but also, during the next activation of the exhaust-gas aftertreatment system, uniform refilling without air pockets is again possible. In a system having at least two dosing valves, there is the risk that, when sucking back, only one line is completely emptied if multiple lines are connected to a suck-back device by way of a connecting piece. This can lead to a mixed phase state (liquid/air/liquid). When the exhaust-gas aftertreatment system is next switched on, the air is possibly distributed unevenly between the two dosing valves during the (re) filling/pressure build-up, and for this reason, as a consequence, incorrect dosing quantities are injected into the exhaust tract and incorrect injections can occur during refilling. Furthermore, pressure drops can occur. In the prior art are connecting pieces which have a hollow body having at least three fluid ports, which ports are connected to one another in a fluid-conducting manner in the hollow body.

The term "emptied state", sometimes also referred to as "defined suck-back state", is intended to be understood below as meaning that all the fluid lines which are situated downstream, that is to say in the direction of the line branch, in particular of the connecting piece, proceeding from the at least one conveying module, are free, preferably completely free, of liquid.

Furthermore, the at least two dosing valves are to be protected against inadvertent transfer of liquid which is in particular not sucked back. Transfer means in particular that the two dosing valves are hydraulically connected to one another by way of the connecting piece, it being possible if, in addition, there is a height difference between the two dosing valves and if, furthermore, there is an air leakage in the lower dosing valve (air exits) and in the upper dosing valve (air enters) for the lower dosing valve to be inadvertently filled with liquid by way of transfer.

SUMMARY OF THE INVENTION

The present invention provides a connecting piece, which, in comparison with the connecting pieces known from the prior art, has the advantage that an emptied state of the exhaust-gas aftertreatment system can be achieved or established or set without further necessary steps. By way of a simple structural measure, the above-described problem is achieved without significant disadvantages arising at the same time. According to the invention, for a connecting piece having at least three fluid ports, it is provided that at least two of the fluid ports are separated from a third fluid port by in each case one membrane, and wherein the respective membrane is permeable to a liquid and, in a state wetted by the liquid, is impermeable to a gas. For use as a membrane, suitable materials necessarily have the property of being impermeable to a gas, in particular air, in a state wetted with a liquid. This means that the pressure difference which is necessary for moving air through the wetted membrane—also referred to as bubble point, the term bubble point being used hereinafter—is significantly greater than the differential pressure which is established at constant throughflow rate or throughflow speed with a liquid at the membrane in each case. The bubble point in itself is determined or defined by the type of membrane in conjunction with the liquid used (capillary pressure). The precise relationships with respect to the bubble point will be discussed once again further below. Liquid is conducted through the membrane as long as there is still contact on the side of the connecting piece, to which the conveying module is connected, to a liquid reservoir. Within the context of the invention, the expression "membrane arranged in a fluid port" is intended to be understood as meaning that the membrane arranged in a fluid port completely closes off the cross section of the fluid port, or completely covers the cross section of the fluid port resulting in the fluid port, such that no liquid and no gas can pass through the fluid port past the membrane.

The decisive feature of the membrane for this property is in particular the bubble point and the bubble point pressure p in a state wetted by a liquid. The bubble point pressure p is related via the mathematical formula $$p = 4 \cdot \sigma \cdot \cos(\theta)/D$$

to the surface tension of the liquid σ (sigma) and the contact angle of the material pairing θ (theta), with material pairing meaning the pairing of a membrane and a liquid and D meaning the pore size of the membrane. In one preferred embodiment of the invention, the membrane has a bubble point pressure p of 20 to 100 mbar, preferably 35 to 100 mbar. In this way, it can be advantageously achieved that, even in the case of high flow resistances, or a large intake height, in the still filled fluid line, no air is sucked in from the fluid line or fluid port that is already emptied. Furthermore, in the case of a bubble point pressure p that is too high, the conveying module may no longer be capable of emptying the connecting piece. The surface tension of a normal liquid exhaust-gas aftertreatment agent lies between approximately 65 and 80 mN/m.

The pore size of the membrane, sometimes also referred to as the mesh size, is preferably selected to be of such a size that no undesirable depositing/separation of particles, in particular dirt particles, is brought about. For this reason, the pore size is preferably selected to be larger than the pore size of filters or protective screens which are optionally fitted upstream in the system. It is therefore preferably provided that the membrane has a pore size greater than 25 m, preferably greater than 40 μm.

Preferably, the membrane is formed from a thermoplastic, in particular from a polyolefin or polypropylene (PP) or a polyamide, in particular polyamide 6.6 (PA6.6). As material for the membranes, use may preferably be made of a large number of materials which are known for use as a membrane, materials such as PP or PA being known in particular for use as a filter in exhaust-gas aftertreatment systems. The materials for the membrane must, as already mentioned above, merely have the property that they have to be impermeable to gases in a state wetted with the liquid.

According to a preferred embodiment of the invention, it is provided that the respective membrane is arranged inclined to the flow direction of the respective fluid port. Alternatively, it is preferably provided that the respective membrane is arranged perpendicular to the flow direction of the respective fluid port. Within the context of the invention, the term "flow direction" does not refer to the actual or real flow, but rather a hypothetical flow parallel to the longitudinal central axis of the fluid line or of the fluid port. Further (real) effects, such as turbulence or flows not parallel to the longitudinal central axis that result from curvatures upstream of the inlet into a fluid line, shall have no relevance to the flow direction within the context of the invention. By way of the preferred, inclined arrangement of the membrane with respect to the flow direction, it is achieved that the drop in pressure at the membrane, which results from the resistance of the membrane for the liquid, is, at the maximum expected volumetric flow rate, at all times less than the bubble point during the emptying, and that the throughflow surface of the membrane is larger than the cross sectional surface of the fluid port that is able to be flowed through.

It is preferably provided that the respective membrane is arranged at an angle of less than 90°, in particular less than 70°, to the flow direction of the respective fluid port. The above-described angles of the membrane to the flow direction are also a measure for a ratio of a flowed-through surface of the membrane to a cross-sectional area of the fluid port in which the membrane is arranged. Furthermore, however, with respect to the membrane, further shapings are also preferred, with the result that the resulting flowed-through surface of the membrane is influenced, that is to say increased or reduced in size. It is preferably provided that, in the case of an inclined membrane, the flowed-through surface of the membrane can be increased in size by way of an undulating form of the membrane. It is furthermore preferably provided that, in the case of a perpendicular membrane, the flowed-through surface of the membrane is increased in size by way of an undulating form of the membrane.

In a preferred embodiment of the invention, the connecting piece has exactly three fluid ports. In this way, an exhaust-gas aftertreatment system having two dosing valves can be activated in a particularly advantageous manner.

The connecting piece is preferably a T-piece or Y-piece. This has the advantage that such T- or Y-pieces can be reliably produced at very low cost and in the required large quantities.

According to a preferred embodiment of the invention, it is provided that all the fluid ports apart from one have in each case one membrane, wherein the fluid port without a membrane is a main port. This embodiment has the advantage that, even in the case of more than two fluid ports, reliable sucking-back is possible for all of them. In an alternative embodiment of the invention, it is provided that, of a total of at least four fluid ports, at least two fluid ports have in each case one membrane and the further at least two fluid ports have no membrane, wherein the two fluid ports without a membrane are firstly a CP pressure port and secondly a CP suck-back port. Within the context of the invention, the term "CP pressure port" is intended to be understood as meaning that said CP pressure port is a port on the connecting piece by way of which, under pressure by the conveying module, by way of a pressure fluid line, a fluid passes into the connecting piece and is subsequently conducted through the connecting piece to the respective dosing valves. The term "CP suck-back port" is intended to be understood as meaning that said CP suck-back port is a port on the connecting piece at which, with the aid of the conveying module, by way of a suck-back fluid line, a negative pressure is applied and the fluid lines between the connecting piece and the dosing valves are thereby emptied. This alternative embodiment with two fluid lines instead of one fluid line between the conveying module and the connecting piece has the advantage that two separate fluid lines are available for the emptying and refilling, so that, in order to establish the emptied state, merely the respective fluid lines between the connecting piece and the dosing valve have to be emptied, and the fluid line between the conveying module and the connecting piece does not additionally need to be emptied.

In a further alternative embodiment of the invention, it is preferably provided that all the fluid ports have in each case one membrane. This has the advantage that, during the fitting of the connecting piece, it is not necessary to ensure the correct port or the correct assignment of the ports with respect to the dosing valves, on the one hand, and the ports with respect to the conveying module, on the other hand.

The invention also relates to a dosing system for dosing a liquid into a system, in particular for an exhaust-gas treatment system of an internal combustion engine, which has at least one conveying module, a main line, at least two fluid lines and at least two dosing valves, wherein the main line is connected in a fluid-conducting manner to the at least one conveying module, and wherein the at least two fluid lines are connected in a fluid-conducting manner to in each case one of the dosing valves, wherein the main line is connected in a fluid-conducting manner to the at least two fluid lines by way of a connecting piece having the features already mentioned above. This yields the advantages already mentioned.

Within the context of the invention, the expression "connected in a fluid-conducting manner" is intended to be understood as meaning that, if, for example by means of a fluid line, a conveying module is connected in a fluid-conducting manner to a dosing valve, this means that the conveying module is arranged on or connected to one end of the fluid line and the dosing valve is arranged on or connected to the other end of the fluid line. In other words, the conveying module is connected to one end of the fluid line and the dosing valve is connected to the other end of the fluid line if, within the context of the invention, it is disclosed that a conveying module is connected in a fluid-conducting manner to a dosing valve by a fluid line.

Further advantages and preferred features and feature combinations will emerge in particular from that which has been described above and from the claims.

BRIEF DESCRIPTION OF THE DRAWINGS

The invention shall be discussed in more detail below on the basis of several figures, in which.

DETAILED DESCRIPTION

Figure 1:
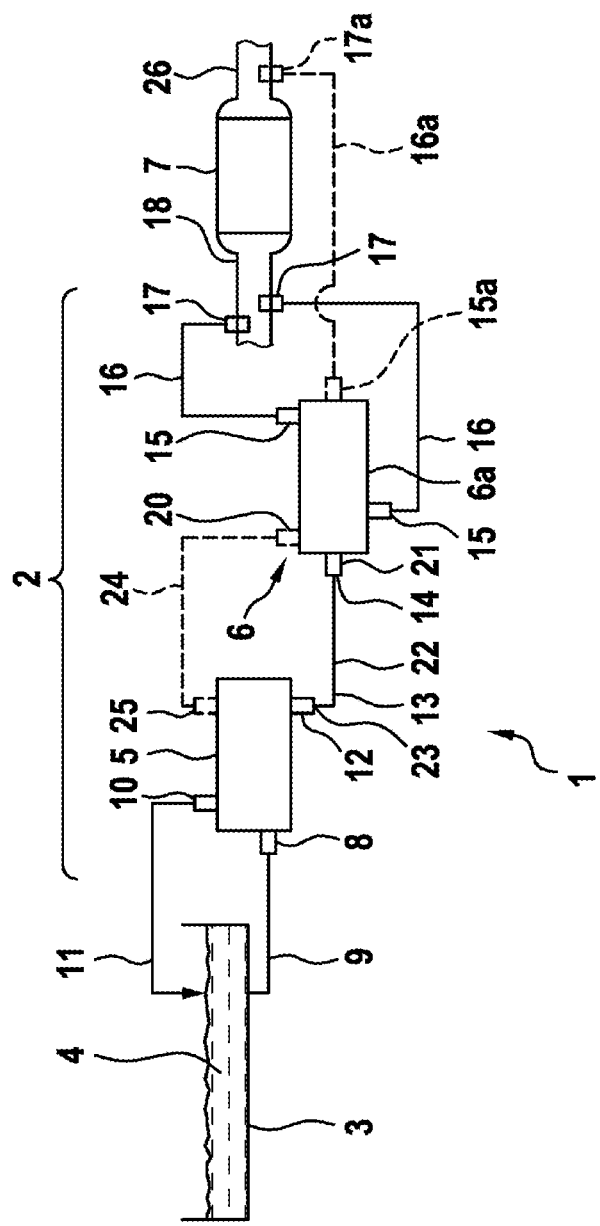
FIG. 1 shows an advantageous dosing system of an exhaust-gas aftertreatment system.

FIG. 1 shows an exhaust-gas aftertreatment system 1 with a dosing system 2 contained therein, wherein the exhaust-gas aftertreatment system 1 has a tank 3, a fluid 4 contained in the tank 3 and dosed by the dosing system 2, a conveying module 5, a connecting piece 6 having a hollow body 6a, and a catalytic converter 7.

A tank intake port 8 of the conveying module 5 is connected in a fluid-conducting manner to the tank 3 by a tank intake fluid line 9. In this way, the fluid 4 can be sucked into the conveying module 5 from the tank 3. In order to be able to convey back into the tank 3 again the fluid 4 accumulating, by emptying of the dosing system 2, in the conveying module 5, the conveying module 5 furthermore has a tank return port 10 which is connected in a fluid-conducting manner to the tank 3 via a tank return fluid line 11. For conveying into the connecting piece 6 the fluid 4 passed through the tank intake port 8 into the conveying module 5, the fluid is conveyed through a conveying port 12 of the conveying module 5 and through a main line 13 to a main port 14 of the connecting piece 6. From there, the fluid 4 is further conveyed, in each case through one of the two fluid ports 15 and through one of the two fluid lines 16, to one of the two dosing valves 17. The dosing valves 17 dose the fluid 4 into an exhaust tract 18 leading or coming from the engine.

Figure 2A:
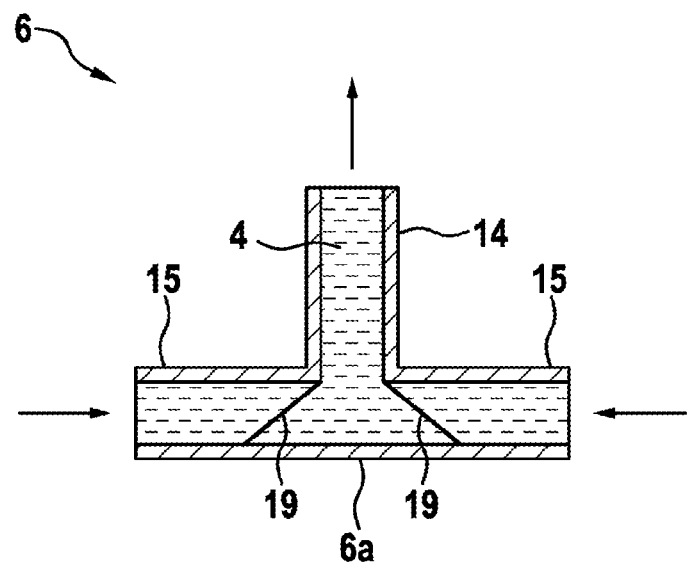
FIGS. 2a to 2d show different states of a connecting piece of the dosing system.

FIG. 2a shows the connecting piece 6 at the start of the emptying of the fluid lines 16 (not shown here in FIG. 2a). In this case, the fluid 4 is sucked away upwardly from the fluid ports 15 through the main port 14 to the conveying module 5 through a membrane 19.

Figure 2B:
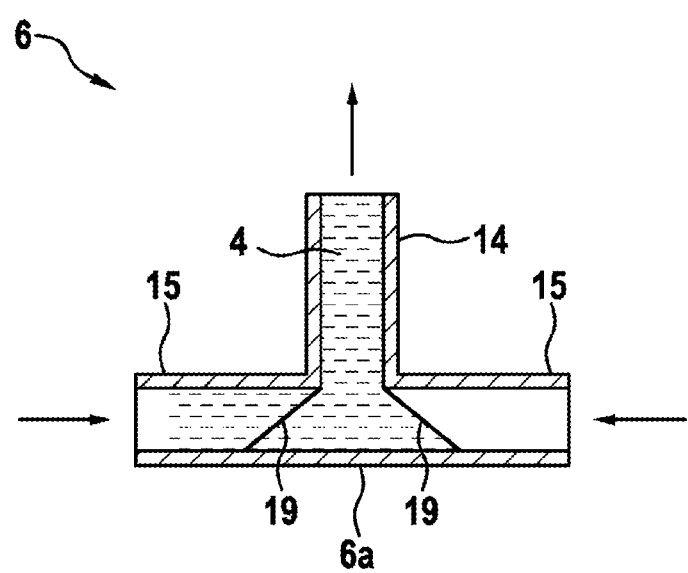

FIG. 2b shows how, as a result of the sucked-in fluid 4, there is a follow-up flow of air into the fluid port 15 illustrated on the right in FIG. 2b, such that the air is present on the membrane 19. The negative pressure, which, at this point in time, is set in the system by the conveying module 5 (not shown here in FIG. 2b) by way of the main port 14, is still of lesser magnitude than the bubble point of the membrane 19. Consequently, no air is sucked through the connecting piece 6 toward the conveying module 5 (not show here in FIG. 2b) through the membrane 19. The fluid 4 present in the left-hand fluid port 15, by contrast, continues to be emptied through the main port 14 in the direction of the conveying module 5 (not shown here in FIG. 2b) through the membrane 19.

Figure 2C:
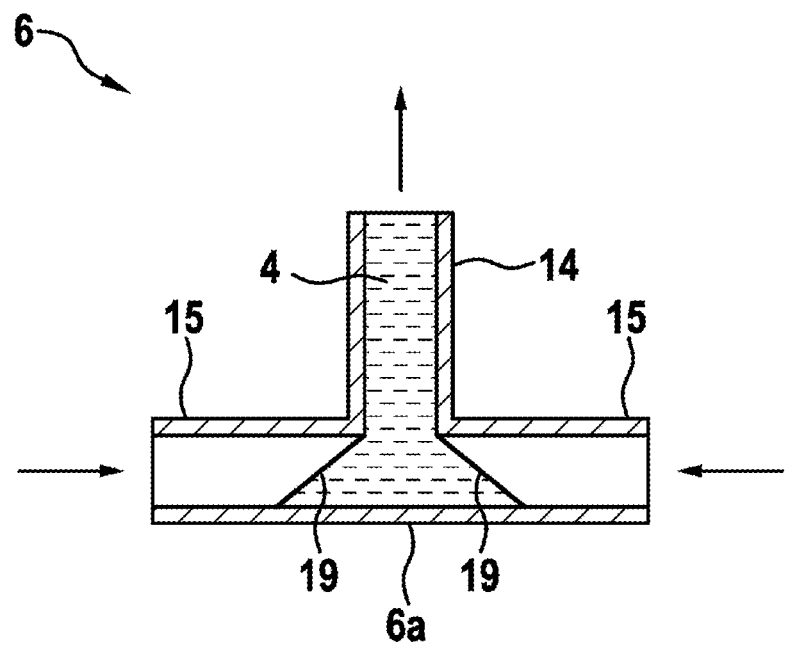

FIG. 2c shows that, as long as fluid 4 is sucked in, air is present as far as both membranes 19, that is to say in the left-hand and right-hand fluid ports 15. Both fluid ports 15 are thus emptied, and the negative pressure in the main port 14 that is generated by the conveying module 5 (not shown here in FIG. 2c) increases in magnitude further until the negative pressure reaches or exceeds in magnitude the bubble point negative pressure. From this point, air is sucked from both fluid ports 15, that is to say the left-hand and right-hand fluid ports, through the respective membranes 19 or else through only one of the two membranes 19.

Figure 2D:
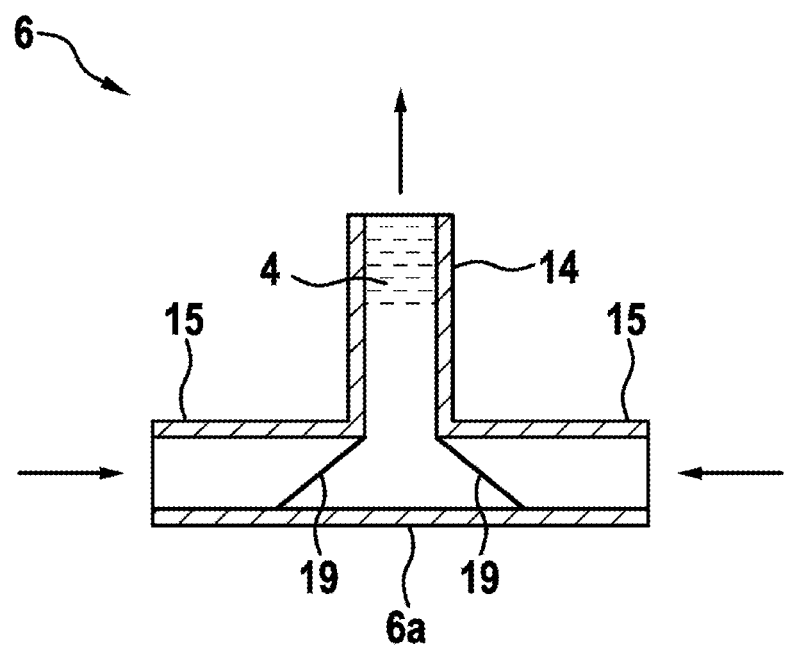

FIG. 2d shows how the emptying of the main port 14 is realized. In this case, as a result of the negative pressure generated by the conveying module 5 (not shown here in FIG. 2d), the fluid 4 still present in the main port 14 is sucked away in the direction of the conveying module 5 (not shown here in FIG. 2d), and there is a follow-up flow of air. Subsequently, the connecting piece 6 or the dosing system 2 (not shown completely here in FIG. 2d) or the exhaust-gas aftertreatment system 1 (not shown completely here in FIG. 2d) is in an emptied state.

An exemplary embodiment for the membrane 19 in FIGS. 2a to 2d includes a membrane 19 composed of polyamide 6.6 (PA6.6), wherein there is a contact angle of 50° between the membrane 19 and the liquid 4, that is to say the liquid exhaust-gas aftertreatment agent, and the pore size of the membrane is 50 m. This results in a bubble point pressure p of 35 mbar.

FIG. 1 furthermore shows that, optionally, the emptying of the connecting piece 6 is not realized through the main port 14 and the main line 13, but rather the emptying is realized through an optional CP suck-back port 20 of the connecting piece 6. In this case, the main port 14 is referred to as a CP pressure port 21, and the main line 13 is referred to as a pressure fluid line 22. Furthermore, at the conveying module 5, the pressure fluid line 22 is connected in a fluid-conducting manner to a CM pressure port 23, hitherto referred to as a conveying port 12. Consequently, during the emptying, in a first step, the fluid 4 is sucked from the dosing valves 17 through the fluid lines 16 to the connecting piece 6. In a second step, the fluid is sucked from the connecting piece 6 through the CP suck-back port 20 and through a suck-back fluid line 24 to a CM suck-back port 25 of the conveying module 5, and thereby to the conveying module 5. In a third step, as already described above, the fluid 4 is conveyed through the tank return port 10 of the conveying module 5 and through the tank return return fluid line 11 back to the tank 3.

FIG. 1 furthermore shows that, optionally, via a further fluid port 15a (shown by dashed lines) on the connecting piece and a further fluid line 16a (shown by dashed lines) and also a further dosing valve 17a (shown by dashed lines), the fluid 4 is also dosed in beyond the catalytic converter 7, into an exhaust tract 26 situated beyond the catalytic converter 7. Beyond this, a further catalytic converter (not shown here) is optionally provided.

The invention claimed is:

1. A connecting piece (6) for fluid lines of an exhaust-gas aftertreatment system (1), the connecting piece comprising a hollow body (6a) having at least three fluid ports (14, 15) connected to one another in a fluid-conducting manner in the hollow body (6a), characterized in that at least two of the fluid ports (15) are separated from a third one of the fluid ports (14) by in each case one respective membrane (19) that is permeable to a liquid and, in a state wetted by the liquid, is impermeable to a gas.

2. The connecting piece (6) as claimed in claim 1, characterized in that the respective membrane (19) has a bubble point pressure p of 20 to 100 mbar.

3. The connecting piece (6) as claimed in claim 1, characterized in that the respective membrane (19) has a pore size greater than 25 μm.

4. The connecting piece (6) as claimed in claim 1, characterized in that the respective membrane (19) is arranged at an angle of less than 90° to a flow direction of the respective fluid port (14, 15).

5. The connecting piece (6) as claimed in claim 1, characterized in that the respective membrane (19) is formed from a thermoplastic.

6. The connecting piece (6) as claimed in claim 1, claim, characterized in that the connecting piece (6) has exactly three fluid ports (14, 15).

7. The connecting piece (6) as claimed in claim 1, characterized in that the connecting piece (6) is a T-piece or Y-piece.

8. The connecting piece (6) as claimed in claim 1, characterized in that the respective membrane (19) is arranged inclined to a flow direction of the respective fluid port (14, 15).

9. The connecting piece (6) as claimed in claim 1, characterized in that the respective membrane (19) is arranged perpendicular to a flow direction of the respective fluid port (14, 15).

10. The connecting piece (6) as claimed in claim 1, characterized in that all of the fluid ports (14, 15) apart from the third one of the fluid ports have in each case one membrane (19), wherein the third one of the fluid ports, without a membrane, is a main port (14).

11. The connecting piece (6) as claimed in claim 1, characterized in that all of the fluid ports (14, 15) have in each case one membrane (19).

12. A dosing system (2) for dosing a liquid into a system, the dosing system comprising at least one conveying device (5), a main line (13), at least two fluid lines (16) and at least two dosing valves (17), wherein the main line (13) is connected in a fluid-conducting manner to the at least one conveying device (5), and wherein the at least two fluid lines (16) are connected in a fluid-conducting manner to in each case one of the dosing valves (17), characterized in that the main line (13) is connected in a fluid-conducting manner to the at least two fluid lines (16) by way of a connecting piece (6) as claimed in claim 1.

13. The connecting piece (6) as claimed in claim 1, characterized in that the respective membrane (19) has a bubble point pressure p of 35 to 100 mbar.

14. The connecting piece (6) as claimed in claim 1, characterized in that the respective membrane (19) has a pore size greater than 40 μm.

15. The connecting piece (6) as claimed in claim 1, characterized in that the respective membrane (19) is arranged at an angle of 70° to a flow direction of the respective fluid port (14, 15).

16. The connecting piece (6) as claimed in claim 1, characterized in that the respective membrane (19) is formed from a polyolefin or polypropylene or a polyamide.

17. The connecting piece (6) as claimed in claim 1, characterized in that the respective membrane (19) is formed from polyamide 6.6.

* * * * *